(12) United States Patent
Sun et al.

(10) Patent No.: US 8,456,830 B2
(45) Date of Patent: Jun. 4, 2013

(54) MOTHERBOARD AND SERVER USING THE SAME

(75) Inventors: Zheng-Heng Sun, Tu-Cheng (TW); Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 248 days.

(21) Appl. No.: 13/095,904

(22) Filed: Apr. 28, 2011

(65) Prior Publication Data
US 2012/0262873 A1    Oct. 18, 2012

(30) Foreign Application Priority Data

Apr. 18, 2011    (CN) .......................... 2011 1 0096230

(51) Int. Cl.
*G06F 1/16*    (2006.01)
(52) U.S. Cl.
USPC ............ 361/679.33; 361/679.02; 361/679.37; 361/724; 361/725; 312/223.1; 312/223.2

(58) Field of Classification Search
USPC .................................................... 361/679.33
See application file for complete search history.

(56) References Cited

U.S. PATENT DOCUMENTS

| 7,724,529 B2 * | 5/2010 | Oyama et al. ................. 361/725 |
| 7,983,032 B2 * | 7/2011 | Walker et al. ............ 361/679.33 |

* cited by examiner

*Primary Examiner* — Anthony Q Edwards
(74) *Attorney, Agent, or Firm* — Altis Law Group, Inc.

(57) ABSTRACT

A motherboard includes a switching circuit, a serial advanced technology attachment (SATA) connector connected to a hard disk drive (HDD), a first serial attached small computer system interface (SCSI) (SAS) connector, and a connector connected to an SAS card. A second SAS connector is arranged on the SAS card and connected to the first SAS connector. The switching circuit is connected to the SATA connector and the first SAS connector. The switching circuit is disconnected from the first SAS connector if the HDD is an SATA HDD. The motherboard communicates with the HDD through the switching circuit and the SATA connector. The switching circuit is connected to the first SAS connector if the HDD is an SAS HDD. The motherboard communicates with the HDD through the SAS card, the first SAS connector, the switching circuit, and the SATA connector.

7 Claims, 2 Drawing Sheets

MOTHERBOARD AND SERVER USING THE SAME

BACKGROUND

1. Technical Field

The present disclosure relates to motherboards, and particularly relates to a motherboard for supporting different types of hard disk drives (HDDs) and a server using the motherboard.

2. Description of Related Art

A serial attached small computer system interface (SCSI) (SAS) hard disk drive (HDD) can function as a selection or expansion storage device of a server. However, when a server supporting only a serial advanced technology attachment (SATA) needs to support an SAS HDD, an SAS card is needed to be connected to the SAS HDD through an SAS cable. Due to the SAS cable being a thick cable, when the SAS card is located far from the SAS HDD, the SAS cable will occupy much space of the server and hinder effective heat dissipating and assembling the server. Therefore, there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
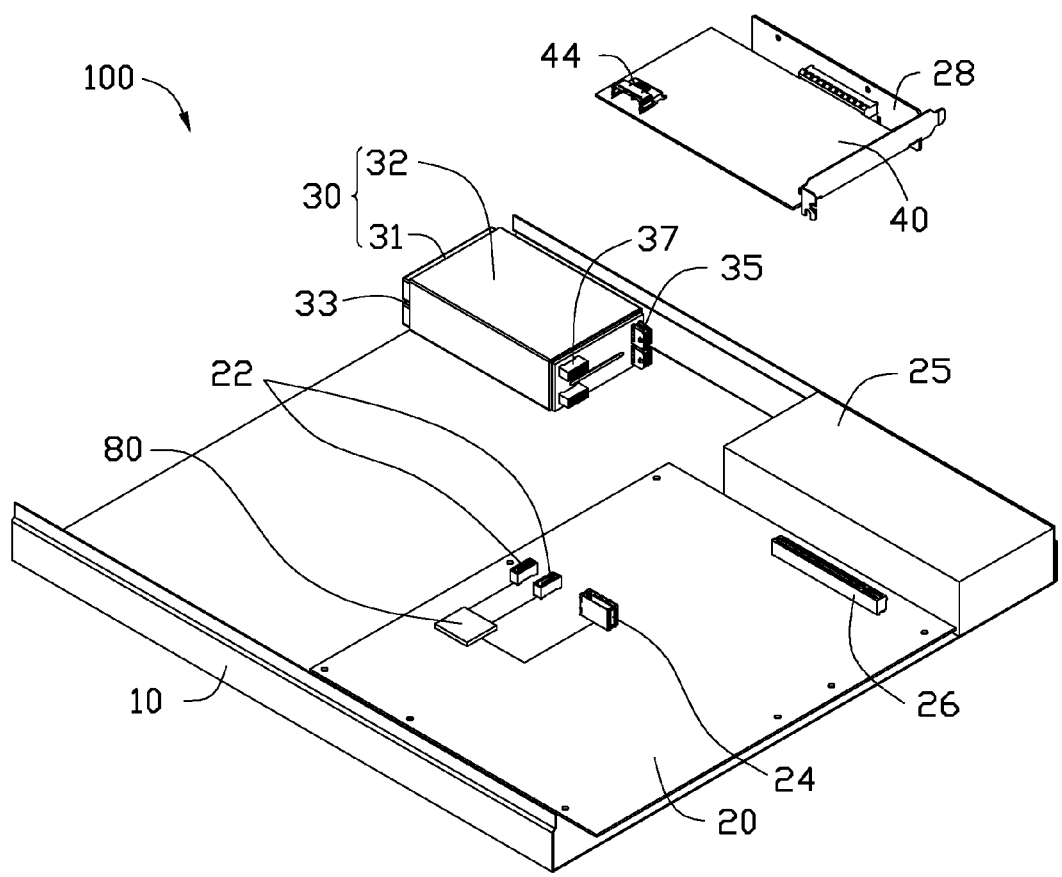
FIG. 1 is an exploded, isometric view of an exemplary embodiment of a server.
Figure 2:
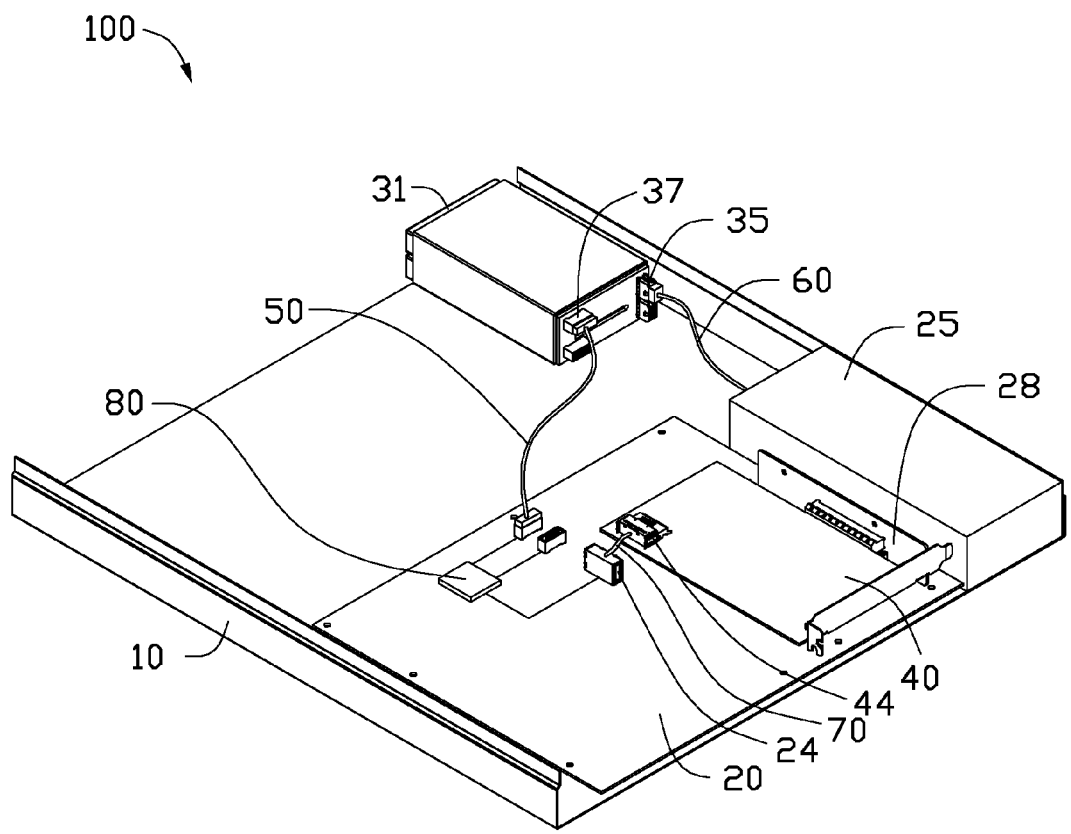
FIG. 2 is an assembled, isometric view of FIG. 1.

Referring to FIGS. 1 and 2, an exemplary embodiment of a server 100 includes a chassis 10, a motherboard 20, a power supply 25, a hard disk drive (HDD) unit 30, and a serial attached small computer system interface (SCSI) (SAS) card 40. The motherboard 20, power supply 25, HDD unit 30, and SAS card 40 are all arranged in the chassis 10.

The HDD unit 30 includes a box-shaped housing 32 and a plurality of HDDs 31 arranged in the housing 32. The housing 32 is fixed at a front portion of the chassis 10, and defines an opening 33 in a front end of the housing 32 through which the HDDs 31 are received. The HDDs 31 may be serial advance technology attachment (SATA) HDDs or SAS HDDs. Each HDD 31 includes a power interface 35 and a data interface 37 both located at a rear end of the HDD opposite to the opening 33. In this embodiment, if the HDD 31 is a SATA HDD, and the data interface 37 is a SATA interface, and the HDD 31 is an SAS HDD, then the data interface 37 is an SAS interface.

The circuit board 20 is arranged on a bottom wall of the chassis 10. The circuit board 20 includes a plurality of SATA connectors 22 for being connected to the data interfaces 37 of the SATA HDDs 31, a switching circuit 80, an SAS connector 24, and a peripheral component interconnection express (PCIE) connector 26. The SAS card 40 is configured to convert signals between the motherboard 20 and the SAS HDD 31. An SAS connector 44 is arranged on the SAS card 40, and connected to the SAS connector 24 of the motherboard 20 through a cable 70. The SAS card 40 is electrically connected to the PCIE connector 26 of the motherboard 20 through an adapter board 28. The switching circuit 80 is connected between the SATA connectors 22 and the SAS connector 24. The power supply 25 includes a plurality of power supply interfaces (not shown) to be connected to the power interfaces 35 of the HDDs 31 through cables 60. In one embodiment, the SAS connector 44 is parallel to the SAS card 40, to be connected to the SAS connector 24 of the motherboard 20 conveniently. The SAS card 40 can be electrically connected to the PCIE connector 26 directly, thereby omitting the PCIE connector 26 to save money.

Referring to FIG. 2, when the HDD 31 is an SATA HDD, then the data interface 37 (e.g. the SATA interface) is connected to the corresponding SATA connector 22 of the motherboard 20 through a SATA cable 50. The sever 100 is then powered on. The switching circuit 80 receives an SATA signal from the SATA HDD 31 through the SATA connector 22 and the SATA cable 50, and is disconnected from the SAS connector 24 of the motherboard 20. Thus, the motherboard 20 communicates with the SATA HDD 31 through the switching circuit 80 and the SATA connector 22.

When the HDD 31 is an SAS HDD, the data interface 37 (e.g. an SAS interface) of the SAS HDD 31 is connected to the corresponding SATA connector 22 of the motherboard 20 through the SATA cable 50 which is compatible with an SAS connector. The server 100 is then powered on. The switching circuit 80 receives SAS signals from the SAS HDD 31 through the SATA connector 22 and the SATA cable 50, and is connected to the SAS connector 24 of the motherboard 20. Thus, the motherboard 20 communicates with the SAS HDD 31 through the SAS card 40, the SAS connector 24, the switching circuit 80, and the SATA connector 22.

The motherboard 20 communicates with the SAS HDD 31 through connecting the SAS connector 44 and the SAS connector 24, and connecting the SATA connector 22 and the data interface 37 of the SAS HDD 31 using the SATA cable 50. The motherboard 20 and the sever 100 using the motherboard 20 can replace the SAS cables with the SATA cables when the motherboard 20 supports the SAS HDD.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A motherboard, comprising:
    a serial advance technology attachment (SATA) connector operable to be connected to a hard disk drive (HDD);
    a first serial attached small computer system interface (SCSI) (SAS) connector operable to be connected to a second SAS connector of an SAS card;

a switching circuit connected between the SATA connector and the first SAS connector; and a connector electrically connected to the SAS card;

wherein if the HDD is an SATA HDD, the switching circuit is disconnected from the first SAS connector, the motherboard communicates with the SATA HDD through the switching circuit and the SATA connector; if the HDD is an SAS HDD, the switching circuit is connected to the first SAS connector, the motherboard communicates with the SAS HDD through the SAS card, the first SAS connector, the switching circuit, and the SATA connector.

2. The motherboard as claimed in claim 1, wherein the connector is a peripheral component interconnection express (PCIE) connector.

3. The motherboard as claimed in claim 1, wherein the SATA connector is operable to be connected to the HDD through an SATA cable.

4. A server, comprising:

a chassis;

a hard disk drive (HDD) arranged in the chassis;

a power supply arranged in the chassis and electrically connected to the HDD;

a serial attached small computer system interface (SCSI) (SAS) card comprising a first SAS connector; and a motherboard arranged in the chassis and comprising:

a serial advance technology attachment (SATA) connector connected to the HDD;

a second SAS connector electrically connected to the first SAS connector;

a switching circuit connected between the SATA connector and the second SAS connector; and a connector electrically connected to the SAS card;

wherein if the HDD is an SATA HDD, the switching circuit is disconnected from the second SAS connector, the motherboard communicates with the SATA HDD through the switching circuit and the SATA connector; if the HDD is an SAS HDD, the switching circuit is connected to the second SAS connector, the motherboard communicates with the SAS HDD through the SAS card, the second SAS connector, the switching circuit, and the SATA connector.

5. The server as claimed in claim 4, wherein the SAS card is electrically connected to the connector of the motherboard through an adapter board.

6. The server as claimed in claim 4, wherein the connector of the motherboard is a peripheral component interconnection express (PCIE) connector.

7. The server as claimed in claim 4, wherein the HDD is connected to the SATA connector of the motherboard through an SATA cable.

* * * * *